Oct. 30, 1945.  W. B. TERRY  2,387,953
TRAFFIC SIGNAL
Filed July 29, 1943
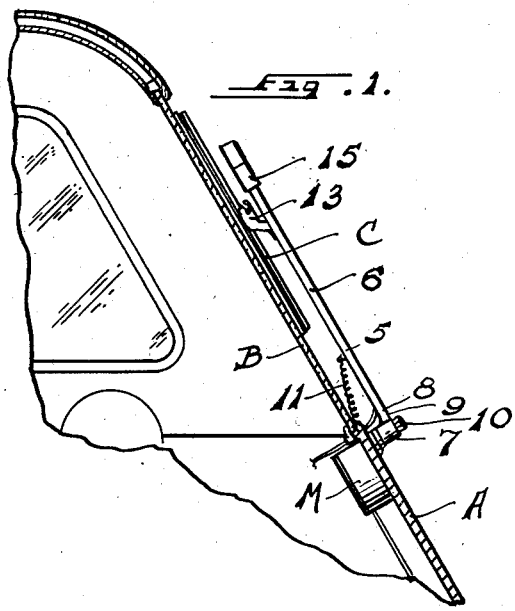
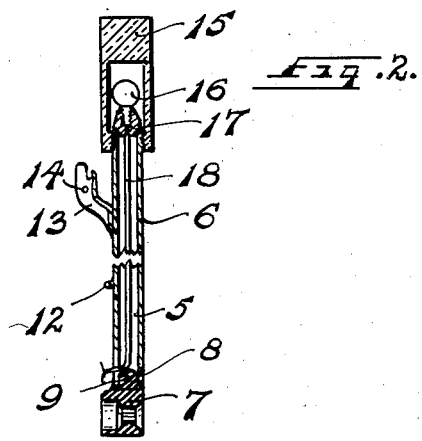
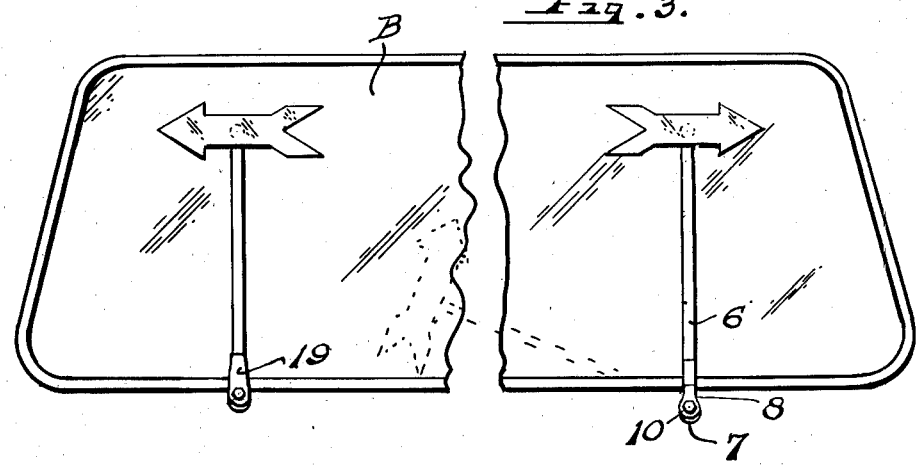
INVENTOR.
Willard B. Terry
BY R. M. Thomas
Attorney Patented Oct. 30, 1945

2,387,953

UNITED STATES PATENT OFFICE 2,387,953

TRAFFIC SIGNAL

Willard B. Terry, Salt Lake City, Utah

Application July 29, 1943, Serial No. 496,609

2 Claims. (Cl. 177—329)

My invention relates to automobile and vehicle signals and has for its object to provide a new and highly efficient signal which will be mounted in or on the rear window of an automobile, truck, bus or trailer and which when used in an automobile will be visible to the driver of the automobile as well as to all approaching traffic.

A further object is to provide a wigwag signal for the rear window of automobiles which will be operated by the same type of motor as those utilized for windshield wipers and which if desired may be used in combination with the wiper blade making it absolutely sure that traffic from each direction will see the signal but in heavy storms the driver of the vehicle will also be able to see his signal working through the rear view mirror without turning around or having other special devices for making certain that the signal is operating.

A further object is to make a combination window wiper for rear windows of an automobile with a direction indicating signal so that two purposes are covered with the one device.

These and many other objects I accomplish with my device illustrated in the accompanying drawing in which similar numerals and letters of reference indicate like parts throughout the several views and as described in the specification forming a part of this application and pointed out in the appended claims.

In the drawing Fig. 1 illustrates a sectional view of a rear window with my device attached for use therein, and thereon.

Fig. 2 is a vertical section of the signal arm.

Fig. 3 is a view of the rear window of the automobile with my device attached thereto, part cut away.

In the drawing in which I have shown my invention I have shown the automobile body as A, and the rear window as B. Mounted in the body A and spaced apart so that one is on each side of the rear window B I provide two vacuum controlled or electrically controlled windshield wiper motors M. These motors are each alike and are controlled from the instrument panel by suitable control means (not shown). Each motor is provided with an oscillating drive shaft which extends out through the body to have a wiper arm 5 engaged thereon in the conventional manner. The arm 5 consists of a hollow tube or shaft 6 pivotally attached to a base 7 by a bifurcated end 8 and pin 9. The base 7 is provided with splines adapted to fit splines on the outer end of the drive shaft of the motors so that the base is oscillated with the drive shaft. A stud bolt 10 is screwed into the end of the drive shaft to hold the base 7 and arm 5 in position. The pivot hole for the pin 9 is made with a loose fit to enable the arm to travel over a curved surface as well as a flat surface should the rear window be made in a curved plane as are some such windows now made. A tension spring 11 is attached to a lug 12 on the lower side of the shaft 6 and to the body by suitable means to provide tension to normally draw the shaft 6 toward the body when the device is being used in conjunction with a wiper blade C. The wiper blade C is one of the conventional window or windshield wiper blades and is attached to the outer end of the shaft 6 by the usual means. This consists of a bifurcated extension 13. For some types of wiper blades a hole 14 is provided in the extension 13 through which a screw may be passed to secure the blade to the shaft.

The outer free end of the shaft 6 is threaded to receive a direction indicating arrow body 15 which body is provided with an opening in alignment with the threaded hole in which an illuminating globe 16 is carried for illuminating the entire body. The arrow body 15 may be made of "Lucite," "Pyralin," Celluloid or other suitable light transmitting materials such as glass so that the globe will light the entire body when burning. A globe socket 17 is mounted in the end of the shaft 6 in which the globe is carried and a wire 18 is connected with a source of electrical power to provide the electrical energy for the globe. The wire is carried to a suitable switch in the driving compartment for controlling the globe.

Should it be desired to use the signal arm without the wiper blade the spring 11 would of necessity be eliminated and a suitable lock be provided to hold the shaft 6 vertical or parallel to the window so that it will not scratch or harm the glass. As will be obvious during summer months and dry weather it will not be desired to use the wiper blade while operating the signal and the above provision must be made for such use.

The two motors M will be synchronized to operate simultaneously if desired for a stop signal and each will be provided with the usual means employed to draw the arm down so that they are not in the way when not in use, as shown in dotted lines.

Two different attachments are shown in Fig. 3 for attaching the shaft 6 to the drive shaft, the attachment 17 shown on the left is the conventional type used by the windshield wipers on the market and the one on the right my attachment as illustrated in Figures 1 and 2, and such modifications are considered within the spirit of the invention and the scope of the appended claims.

Having thus described my invention I desire to secure by Letters Patent and claim:

1. A traffic signal device, mounted one on each side of the rear window of a motor vehicle and adapted to be actuated individually to indicate that a turn is intended by the driver, comprising driving motors, a hollow signal arm extending up over the window from the motor to oscillate over the face of the window; a signal arrow mounted on the top end of said arm; a light globe carried in said arrow; an electrical wire carried in said arm to connect the globe with a source of electrical energy; individual spring means to normally hold the arms tensioned toward said window; a window wiper attached to the inner face of each of said arms to clean the window when the signal is operating enabling the driver full clear vision simultaneously with full view of the signal arrow.

2. A signal device comprising a windshield wiper mounted at the rear window of an automobile, said wiper to clean the window; and a direction indicating arrow mounted at the top end of said windshield wiper to indicate a turn is intended; and a means to illuminate said arrow.

WILLARD B. TERRY.